United States Patent
Vincent

(10) Patent No.: US 7,325,841 B2
(45) Date of Patent: Feb. 5, 2008

(54) DEVICE FOR THE COAXIAL CONNECTION OF TWO MANIFOLDS

(75) Inventor: Philippe Vincent, Epernon (FR)

(73) Assignee: Valeo Climatisation, S.A., LaVerriere (FR)

( * ) Notice: Subject to any disclaimer, the term of this patent is extended or adjusted under 35 U.S.C. 154(b) by 26 days.

(21) Appl. No.: 10/990,813

(22) Filed: Nov. 17, 2004

(65) Prior Publication Data
US 2005/0110273 A1    May 26, 2005

(30) Foreign Application Priority Data
Nov. 24, 2003    (FR) ..................... 03 13726

(51) Int. Cl.
*F16L 37/00* (2006.01)
(52) U.S. Cl. .................. 285/305; 285/420; 285/364
(58) Field of Classification Search .............. 285/305, 285/317, 406, 420, 364, 921
See application file for complete search history.

(56) References Cited

U.S. PATENT DOCUMENTS

| | | | | |
|---|---|---|---|---|
| 4,913,468 | A | * | 4/1990 | Rattmann ............. 285/82 |
| 4,938,510 | A | * | 7/1990 | Gmeiner et al. ......... 285/39 |
| 5,820,168 | A | * | 10/1998 | De Giacomoni ....... 285/192 |
| 5,909,725 | A | * | 6/1999 | Balsdon et al. ........ 123/516 |
| 6,179,345 | B1 | * | 1/2001 | Gensert et al. ......... 285/305 |
| 6,250,693 | B1 | | 6/2001 | Gensert et al. |
| 6,409,228 | B1 | | 6/2002 | Fadini et al. |
| 6,508,491 | B1 | * | 1/2003 | Ebinger et al. ........ 285/223 |
| 6,846,023 | B2 | * | 1/2005 | Ebinger et al. ........ 285/420 |

FOREIGN PATENT DOCUMENTS

| | | |
|---|---|---|
| DE | 199 21 682 A | 11/2000 |
| DE | 199 64 221 A | 6/2001 |

* cited by examiner

*Primary Examiner*—David Bochna
(74) *Attorney, Agent, or Firm*—Howard & Howard Attorneys, P.C.

(57) ABSTRACT

A coaxial connection having a device and a first manifold (12) comprising a protrusion (18) able to be received in a neck (22) on a second manifold (14). The device is produced in the form of an open collar (10) produced from an elastically deformable material and having a bottom (36) extended by two arms (38) having respective ends which define the opening of the collar. The collar is provided with retaining stops (44, 46, 48) and at least one locking member (60) arranged so as to cooperate with an engagement region (34) of at least one of the manifolds in order to prevent any accidental extraction of the open collar once fitted. Application in particular to heat exchangers for motor vehicles.

19 Claims, 2 Drawing Sheets

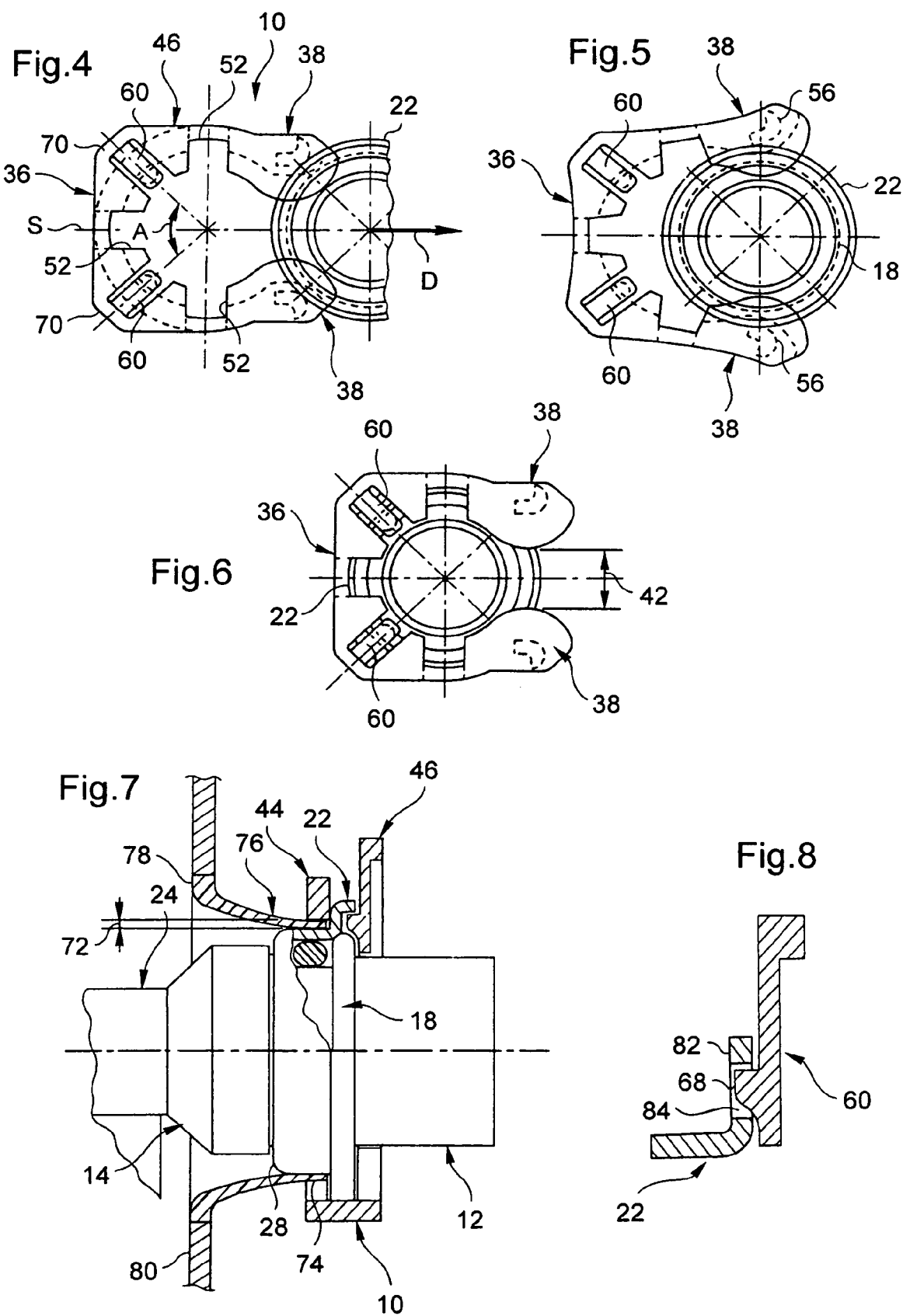

DEVICE FOR THE COAXIAL CONNECTION OF TWO MANIFOLDS

TITLE OF THE INVENTION

The invention concerns the end to end coaxial connection of two manifolds in a fluid circuit, in particular in a motor vehicle.

It concerns more particularly a device for the coaxial connection of two manifolds by cooperation of an end region of a first manifold with an end region of a second manifold, the first manifold comprising a protrusion able to be received in a neck on the second manifold, the device comprising an open collar produced from an elastically deformable material and having a bottom extended by two arms having respective ends which define the opening of the collar and which are able to separate when the open collar is put in place in an insertion direction which is generally radial with respect to the axis of the manifolds and then to move together again after the open collar is put in place.

BACKGROUND OF THE INVENTION

Connection devices of this type which are used particularly for providing a connection within a heat transfer fluid circuit in a motor vehicle are already known. For this purpose, a particular application of such a device is the connection of an inlet or outlet manifold for a heat exchanger, in which the heat exchange fluid must exchange heat with another medium, and a conduit bringing the fluid into or out of this heat exchanger.

The term "manifold" means here generally any fluid transfer means which comprises at least one tubular part such as for example a tube, conduit, a connecting piece, a distance tube, etc.

The function of the connection device is to axially force the neck and protrusion towards one another in order to ensure a seal, preferably by clamping an annular seal between them in a fluidtight manner.

There is already known, in particular through FR 2 738 894, a connection device of this type which is produced in the form of an open collar, generally in the form of a C, and which is assembled in a radial movement, that is to say perpendicular to the common axis of the manifolds.

In these known solutions, the choice of the material making up the collar is essential for providing a mechanical connection. It is a case of a metallic collar, generally made from spring steel, the choice of this material being justified by the need for sufficient flexibility to enable the collar to separate on passing over the manifold and to be at the same time sufficiently rigid to guarantee the holding of the manifolds and to prevent excessively easy extraction of the collar after it is fitted.

These known solutions have in particular the drawback of using an expensive material which in addition must undergo high-cost anticorrosion treatment so that the total price of the component is uncompetitive compared with a solution using a plastics material.

In addition, although this collar is held on the manifolds by the spring effect of the material used, it nevertheless remains vulnerable to extraction.

However, for certain fluid connections which entail risk, it is necessary to guarantee the prevention of a disconnection of the collar under a very high force.

Moreover, assembling the collar on the manifolds also poses difficulties. This is because the ends of the metallic collar are defined so as to be in abutment on the periphery of the neck, protrusion or manifolds, and thus so as to be able to move away as soon as a radial assembly pressure is exerted.

In these known solutions, the collar has no axial holding stop which would make it possible to guide it at the start of its assembly movement. The result is therefore a high risk of faulty mounting of the collar on the manifolds and therefore a risk of not providing the required seal function.

BRIEF SUMMARY OF THE INVENTION

The purpose of the invention is in particular to surmount the aforementioned drawbacks.

It proposes to this end a connection device of the type defined above in which the open collar is provided with retaining slots able to exert an axial abutment against the neck and against the protrusion in order to force them towards one another, and in which the open collar is also provided with at least one locking member situated in the region of the bottom and arranged so as to cooperate with an engagement region provided in the end region of at least one of the manifolds in order to prevent the open collar, once put in place, from moving in a direction opposite to its insertion direction.

As in the known solutions, the open collar is deformable and is therefore held on the end regions of the manifolds by elastic deformation.

However, as this open collar has at least one locking member which cooperates with at least one of the end regions of the manifolds, this prevents any unwanted removal of the collar once put in place.

The result is greater security. Under these circumstances, the use of a metallic material, in particular of a spring steel, is no longer necessary in order to produce the open collar.

The presence of the locking member makes the open collar practically non-removable unless the locking member is intentionally deformed or broken to enable the collar to be removed.

Other characteristics, complementary and/or alternative, of the invention are as follows:
- the locking member is produced in the form of a deformable tongue, one end of which is attached to a peripheral edge of the collar and the other end of which is provided with a tooth extending in a substantially axial direction and arranged so as to cooperate with the engagement region;
- the deformable tongue extends in a substantially radial direction from the peripheral edge of the open collar;
- the open collar comprises two flanks in a C shape overall spaced apart axially, whilst the locking member is cut in one of the flanks;
- the two flanks with a general C shape of the open collar are connected to each other by bridges of material which extend in the axial direction;
- each of the retaining stops has a general cross-section in the form of a U with two support arms cut respectively in the two flanks of the open collar;
- the open collar comprises at least two locking members which alternate with retaining stops;
- the open collar has an axis of symmetry passing through the middle of the opening and comprises two locking members which extend symmetrically on each side of the axis of symmetry;
- the ends of the arms of the open collar are provided with guide profiles to facilitate the separation of the arms when the open collar is put in place and to facilitate the engagement of the retaining stops;

the bottom of the open collar is curved;

an annular clearance is provided between the neck and the open collar for fitting a sealing lip;

the locking member is produced so as to be removable by rupture or deformation;

the open collar is produced from a plastics material.

In another aspect, the invention concerns a set of manifolds comprising a first manifold having an end region arranged so as to cooperate with an end region of a second manifold, the first manifold comprising a protrusion able to be received in the neck of the second manifold, the set of manifolds being arranged so as to be connected by means of a connection device as defined previously, at least one of the manifolds being arranged so as to define at least one engagement region for the locking member.

By way of example, this engagement region can be an annular space between the protrusion and the neck, or a slot arranged in an annular face of the neck.

In the following description, given solely by way of example, reference is made to the accompanying drawings, in which:

BRIEF DESCRIPTION OF THE DRAWINGS

FIGS. 4, 5 and 6 illustrate three steps of fitting the connection device of FIGS. 1 to 3;

FIG. 7 is a view in section similar to FIG. 1, in which a flexible sealing lip is added to the connection device; and FIG. 8 is a partial view in section showing the cooperation of a locking member in a variant embodiment.

DETAILED DESCRIPTION OF THE INVENTION

Figure 1:
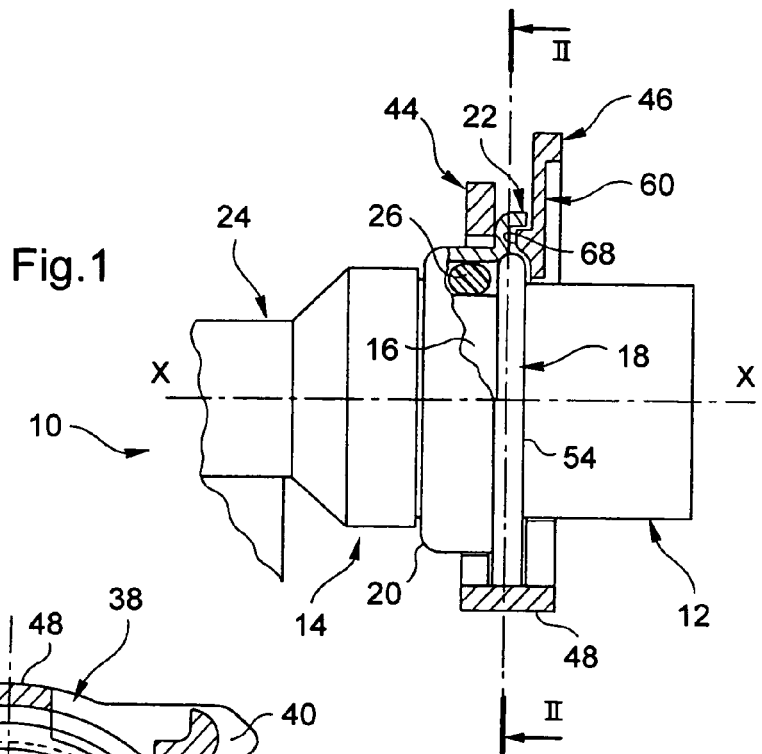
FIG. 1 is a view in section of a manifold connection device according to the invention, the section being taken along the line I-I in FIG. 2.
Figure 2:
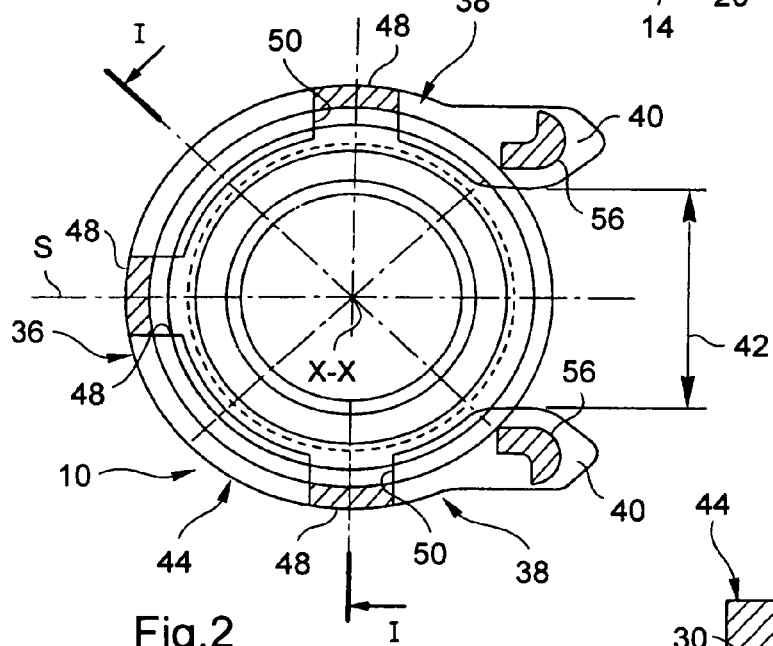
FIG. 2 is a view in section along the line II-II in FIG. 1.

Reference is made first of all to FIGS. 1 and 2, which show a connection device produced in the form of an open collar 10 and used for the coaxial connection (axis XX) of a first manifold 12, or male manifold, and a second manifold 14, or female manifold. The manifold 12 comprises an end region 16 provided with a peripheral protrusion 18 which defines an annular rim, whilst the manifold 14 comprises an end region 20 which defines a neck 22 in which the protrusion 18 is at least partly engaged. The end regions 16 and 20 are designed so as to cooperate mutually, here by fitting together.

In the example, the manifold 14 constitutes an inlet or outlet manifold for a heat exchanger 24 (depicted partially) whilst the manifold 12 constitutes a conduit bringing a heat transfer fluid into or out of this heat exchanger. In a preferential application of the invention, the heat exchanger 24 constitutes a cooling radiator for a motor vehicle engine or a heating radiator for the cabin of such a vehicle.

In order to effect a sealed connection between the two manifolds, an annular seal 26 is inserted on mounting between the neck and the protrusion, the open collar 10 being arranged so as to axially force the protrusion 18 and the neck 22 towards one another so as to compress the seal 26 and guarantee fluidtightness.

Figure 3:
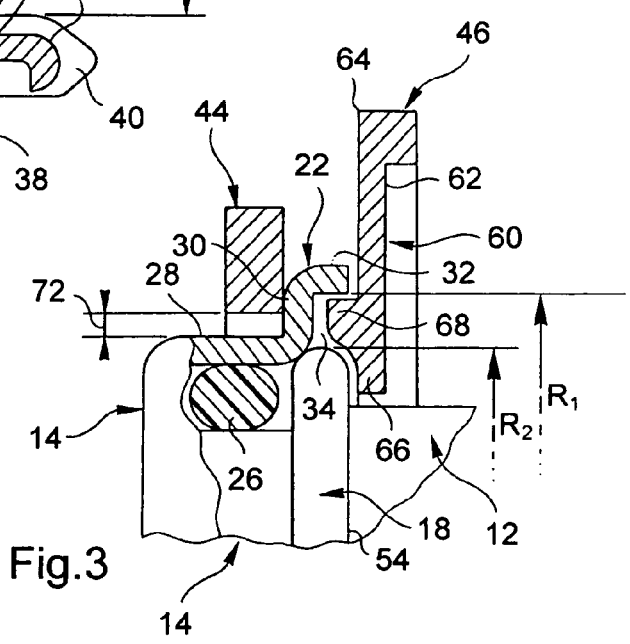
FIG. 3 is a detail, to an enlarged scale, of FIG. 1.

On the detail in FIG. 3, it can be seen that the neck 22 extends a cylindrical part 28 of the manifold 14 and that it has an L-shaped section with an annular part 30 and a cylindrical part 32. The cylindrical part 32 defines an internal radius R1 (FIG. 3) greater than the external radius R2 of the protrusion 18, which makes it possible to define an annular region 34, also referred to as the engagement region, whose function will be explained below.

The open collar 10 (FIG. 2) is adapted to engage laterally (radial assembly) on the two manifolds 12 and 14 whose end regions have previously been fitted together. The open collar 10 is produced from an elastically deformable material. In the example embodiment, it has a curved bottom 36 extended by two arms 38 having respective ends 40 which define an opening 42. The open collar has an axis of symmetry S which passes through the middle of the opening 42.

In the example, the open collar 10 comprises two flanks in the general form of a C, namely a flank 44 situated to the left of FIG. 1, and which can also be seen in FIG. 2, and a flank 46 shown on the right in FIG. 1, and which can also be seen in FIGS. 4 to 6. These two flanks are spaced apart axially and joined together by bridges of material 48 which extend in the axial direction XX.

The flank 44 (FIG. 2) comprises three radial cutouts 50 situated at 90° from each other, which facilitate the deformation of the open ring, in particular the separation of its arms, as will be seen below. In the same way, the flank 46 comprises three similar cutouts 52 (FIGS. 6 to 6) which have the same function as the cutouts 50.

The bridges of material 48, in combination with the flanks 44 and 46, define a peripheral U-shaped groove turned towards the axis XX and able to bear on the one hand against the neck 22 (more precisely against its annular part 30) (FIGS. 1 and 3) and on the other hand against an annular region 54 (FIGS. 1 and 3) of the protrusion 18.

It will be understood that the cutouts 50 and 52 formed respectively in the flanks 44 and 46 contribute to the formation of the aforementioned axial retaining stops and to the flexibility (axial deformation) of the collar 10.

As can also be seen in FIG. 2, the ends 40 of the arms 38 are provided with guide profiles 56 intended to facilitate the separation of the arms when the collar is fitted and to facilitate the engagement of the retaining stops. These guide profiles 56 define two facing ramps and each of them extends between the aforementioned flanks 44 and 46.

According to essential characteristic of the invention, the open collar is provided with at least one locking member 60 (FIGS. 1 and 3), here two locking members (FIGS. 4 to 6). These two locking members 60 are formed by cutting in the flank 46. In the example, these two locking members 60 are each produced in the form of a deformable tongue, one end 62 of which is attached to a peripheral edge 64 of the collar and another end of which 66 is provided with a tooth 68 extending in a substantially axial direction and arranged so as to cooperate with the aforementioned engagement region 34 (FIGS. 1 and 3).

The two tongues 60 extend symmetrically with respect to the axis of symmetry S (FIG. 4) and, in the example, form between them an angle A of 90°. It should be noted that the locking members 60 alternate with the axial retaining stops. As can be seen loin FIG. 4, the flank 46 comprises two extension 70 which also form between them an angle A, and from which the respective ends 62 of the two tongues are connected.

The tongues are sized and designed so that their respective teeth can engage in the aforementioned engagement region 34. The connection device of FIGS. 1 to 3 is used in the following manner. After fitting together of the end regions of the two manifolds with the insertion of the seal 26, the open ring 10 is presented laterally, as shown in FIG.

4. The guide profiles 56 come into abutment against the cylindrical part 32 of the neck 22, that is to say against the largest-diameter part of the assembly thus obtained. The ring is next moved in an insertion direction D (FIG. 4), which also corresponds to its axis of symmetry S.

As the open collar is engaged, in the aforementioned direction D, the arms 38 separate mutually whilst deforming the collar. This deformation is facilitated by the presence of the cutouts in the flanks 44 and 46. During this separation, the guide profiles 56 guarantee that the axial retaining stops engage in the protrusion and the neck of the manifolds, during the assembly movement of the collar.

Once the collar is completely engaged (FIG. 6), the collar 22 comes into abutment against the internal part of the curved bottom 36 and the arms 38 move together mutually, the ends 40 of the arms then defining an opening 42 (FIG. 6) whose distance is less than the outside diameter of the collar.

During this insertion movement, the two locking members 60 separate in the axial direction and their respective teeth 68 are separated in the axial direction in order then to move in the opposite direction, in the same axial direction, and engage in the engagement region 34, as shown in FIG. 3. The presence of these two locking members, which are situated in the region of the curved bottom 36, and therefore opposite to the opening 42, helps with holding the collar in the assembly position. In this way, this collar can also be produced from plastics material, for example from a material of the polyamide type.

As a result the collar cannot be removed unexpectedly.

If it is wished to remove the open collar, it is necessary to intentionally deform or break the locking member or members in order to allow the extraction of the collar in a direction opposite to the insertion direction D.

Reference is now made to FIG. 7, which shows two manifolds and a connection device similar to those in FIG. 1. As can be seen in FIGS. 3 and 7, there exists an annular clearance 72 between the cylindrical part 28 of the collar 22 and the inside of the flank 44. Advantage is taken of the presence of this clearance 72 to house therein the end 74 of a flexible sealing lip 76, another end 78 of which is connected to a wall 80 which may, for example, form part of a casing housing the heat exchanger 24 (FIG. 7).

In the variant embodiment in FIG. 8, the locking member 60 is similar to that shown in FIGS. 1 to 3. On the other hand, the neck 22 has a different end profile which ends in an annular face 82 in which appropriate slots 84 are provided. These slots 84 constitute another embodiment of an engagement region for cooperation with the teeth 68 of the locking member or members.

In general terms, the device of the invention comprises one or more locking members which cooperate with an engagement region, the latter being formed by at least one of the manifolds.

The invention finds a general application in fluid circuits and a particular application in motor vehicle fluid circuits.

What is claimed is:

1. A coaxial connection device of two manifolds comprising:
   a first manifold having a protrusion on an end region of the first manifold;
   a second manifold having a neck on an end region of the second manifold;
   the first and second manifolds disposed about an axis (XX);
   an engagement region on the end region of the first or the second manifold;
   an elastically deformable open collar having a bottom;
   the open collar including two flexible arms extending from the bottom and defining an opening of the open collar;
   the flexible arms separating radially apart from one another with respect to the axis (XX) when the open collar engages at least one of the manifolds while moving in an insertion direction (D) and the flexible arms moving towards one another after movement continues in the insertion direction (D);
   axial holding or retaining slots located on the open collar such that the slots exert an axial abutment against the protrusion of the first manifold and the neck of the second manifold; and
   at least one locking member situated in a region of the bottom of the open collar and cooperating with the engagement region of the first or second manifold to prevent the open collar from moving in a direction opposite to the insertion direction (D).

2. A coaxial connection device, as in claim 1, wherein the neck and the protrusion form a fluid tight seal when they are abutted together.

3. A coaxial connection device, as in claim 1, further comprising an annular seal (26) between the neck and the protrusion such that a fluid tight seal is formed.

4. A coaxial connection device, as in claim 1, wherein the locking member (60) is in the form of a deformable tongue.

5. A coaxial connection device, as in claim 4, wherein the deformable tongue has two ends, one end having a tooth that extends in a substantially axial direction such that it cooperates with the engagement region.

6. A coaxial connection device, as in claim 5, wherein one end (62) of the deformable tongue is attached to a peripheral edge (64) of the collar (10) and the other end (66) of the deformable tongue has the tooth (68) that extends in the substantially axial direction such that it cooperates with the engagement region (34; 84).

7. A coaxial connection device, as in claim 5, wherein the deformable tongue extends in a substantially radial direction from the peripheral edge (64) of the open collar (10).

8. A coaxial connection device, as in claim 1, wherein the open collar (10) comprises two flanks (44, 46) in a C shape overall spaced apart axially, and in that the locking member (60) is cut in one (46) of the flanks.

9. A coaxial connection device, as in claim 8, wherein the two flanks (44, 46) with a general C shape of the open collar (10) are connected to each other by bridges of material (48) which extend in the axial direction (XX).

10. A coaxial connection device, as in claim 8, wherein each of the retaining slots (44, 46, 48) has a general cross-section in the form of a U with two support arms (44, 46) cut respectively in the two flanks of the open collar.

11. A coaxial connection device, as in claim 1, wherein the at least one locking member is further defined as at least two locking members (60) which alternate with retaining stops (44, 46, 48).

12. A coaxial connection device, as in claim 1, wherein the open collar (10) has an axis of symmetry (S) passing through the middle of the opening (42) and the at least one locking member is further defined as two locking members (60) which extend symmetrically on each side of the axis of symmetry.

13. A coaxial connection device, as in claim 1, further comprising guide profiles on the ends (40) of the arms (38) of the open collar (10), wherein the guide profiles (56) facilitate the separation of the arms (38) and the engagement of the retaining slots.

14. A coaxial connection device, as in claim 1 wherein the bottom (36) of the open collar (10) is curved.

15. A coaxial connection device, as in claim 1, further comprising an annular clearance (72) between the neck (22) and the open collar (10) and a sealing lip (72).

16. A coaxial connection device, as in claim 1, wherein the locking member (60) is removable by rupture or deformation.

17. A coaxial connection device, as in claim 1, wherein the open collar (10) is produced from a plastics material.

18. A coaxial connection device, as in claim 1, wherein the engagement region is an annular space (34) between the protrusion (18) and the neck (22).

19. A coaxial connection device, as in claim 18, wherein the engagement region is a slot (84) provided in an annular face (82) of the neck (22).

* * * * *